March 26, 1963  H. W. BLETZ  3,083,282
INFINITE CONTROL SWITCH
Filed July 13, 1959  2 Sheets-Sheet 1
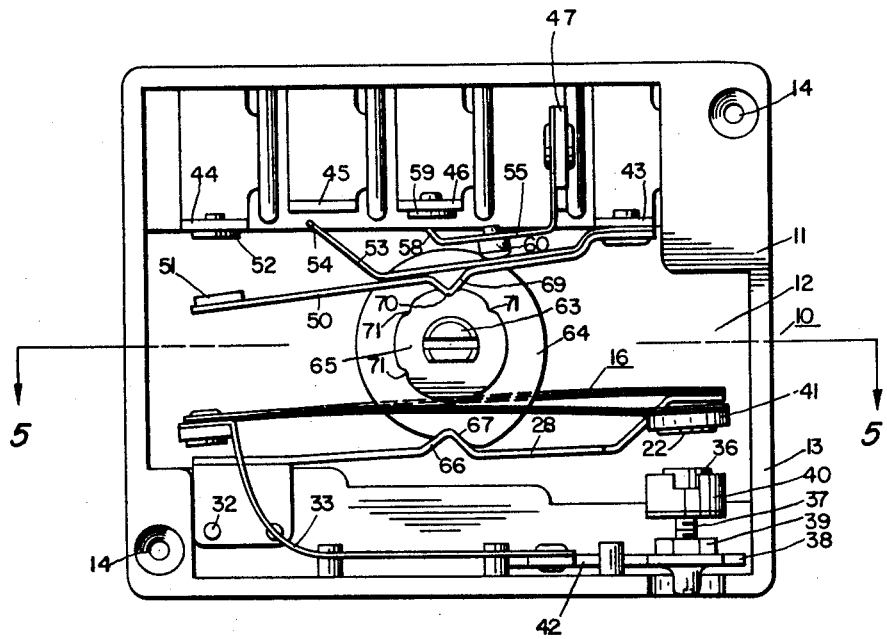
Fig. 1
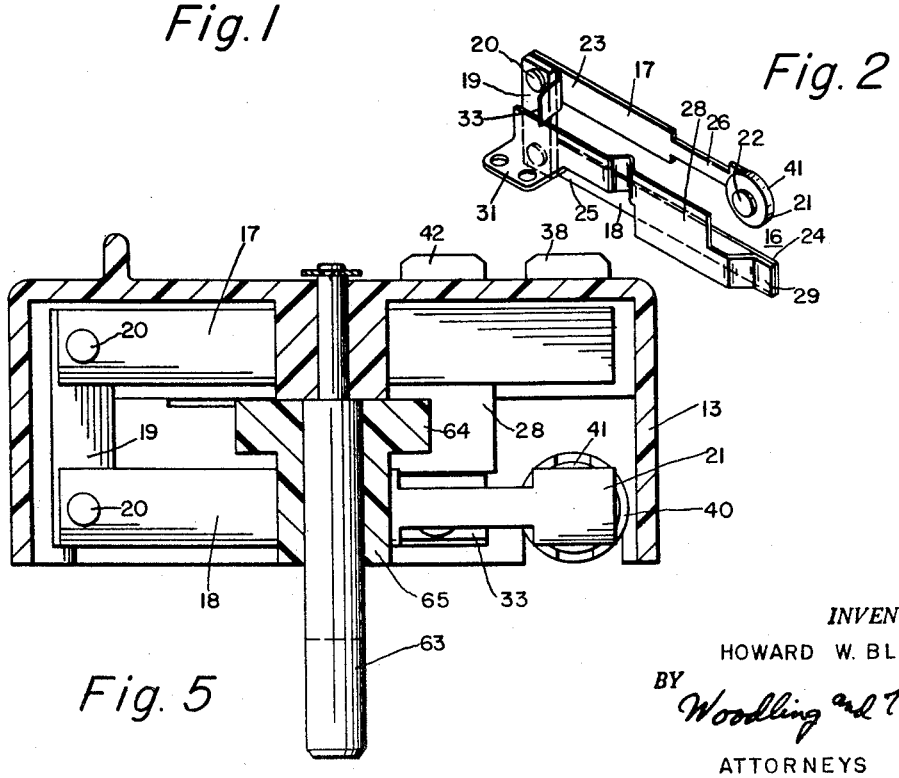
Fig. 2
Fig. 5
INVENTOR.
HOWARD W. BLETZ
BY Woodling and Krost,
ATTORNEYS United States Patent Office 3,083,282
Patented Mar. 26, 1963

3,083,282
INFINITE CONTROL SWITCH
Howard W. Bletz, Lexington, Ohio, assignor to Stevens Manufacturing Company, Inc., a corporation of Ohio
Filed July 13, 1959, Ser. No. 826,724
10 Claims. (Cl. 200—122)

The invention relates in general to thermostatic switches and more particularly to an infinitely variable thermostatic control switch which may be used to control a heating unit.

Household electric ranges in the past have utilized multiple position switches to establish different discrete heats. These have been three, five, or seven discrete positions for energizing two separate heating elements, for example, either in series or parallel and either for 115 volts or 230 volts, for example. The use of such plural position switches means that the user of the electric range has only these seven different heats available and one might be not quite enough heat for the particular cooking operation and yet the next higher heat might be too much heat. For example, suppose one wants to boil water in a vessel containing food and to have the boiling be rather vigorous yet not to boil over. In the past the seven heat switches have very often been incapable of selecting the exact heat requirement to the vessel to establish the required boiling rate without boiling over. Additionally, the use of such seven heat switches requires the use of the surface heating unit which has two separate heating elements.

Accordingly, an object of the present invention is to provide an infinite control thermostatic switch to control an electric range surface unit.

Another object of the invention is to provide a proportioning switch capable of an infinite variety of adjustments to control heat to an electrical resistance unit.

Another object of the invention is to provide a thermostatic switch which is ambient compensated.

Another object of the invention is to provide a thermostatic switch which will maintain a constant wattage in an electric resistance unit.

Another object of the invention is to provide a thermostatic switch for control of an electric range surface unit wherein the surface unit need have only a single resistance element.

Other objects and a fuller understanding of this invention may be had by referring to the following description and claims taken in conjunction with the accompanying drawings, in which:

FIGURE 1 is a plan view of a thermostatic switch embodying the invention;

FIGURE 2 is an isometric view of the bimetallic structure of the switch;

FIGURE 5 is a sectional view on line 5—5 of FIGURE 1.

Figure 3:
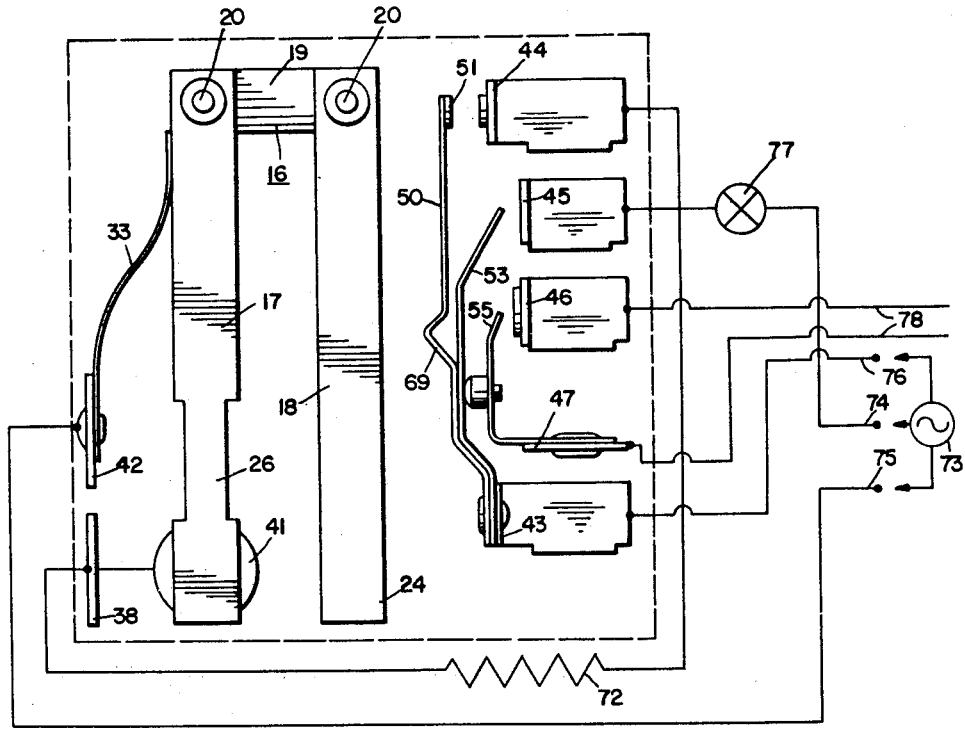
FIGURE 3 is a combined schematic and circuit diagram of the switch.

The FIGURES 1, 2, and 3 show a thermostatic switch 10 incorporating the invention and including an insulated housing 11 having a base 12 and raised peripheral walls 13. A cover, not shown, may be fastened at holes 14 to enclose the switch parts. A bimetallic U-shaped structure 16 is incorporated in the switch 10 and is best shown in FIGURE 2. This bimetal includes first and second legs 17 and 18 joined together by an insulating bar 19 and rivets 20 to form the U-shaped structure. The first leg 17 has a first end 21 carrying a first movable contact 22. The second end 23 of the first leg 17 is that which is riveted to the insulating bar 19. A narrowed portion 26 is closely adjacent the first end 21 of the first leg 17. The second leg 18 has first and second ends 24 and 25 with the second end 25 being that which is connected to the insulating bar 19. A resilient support blade 28 which conveniently may be made of metal has first and second ends 29 and 30. The first end 29 of the support blade 28 is fixedly attached, such as by welding, to the first end 24 of the bimetallic leg 18 so that this support blade 28 supports the entire bimetallic U-shaped structure 16. A mounting flange 31 is a part of the second end 30 and is fastened in any suitable manner such as by rivets 32 to the base 12. As seen in FIGURE 1, the bimetallic U-shaped structure 16 is disposed generally in a plane perpendicular to the base 12. A flexible pigtail conductor 33 has one end connected to the second end 23 of the bimetallic leg 17 at the rivet 20.

A first fixed contact 36 is mounted on a screw 37 with the screw passing through a first terminal 38 fixedly carried in the base 12. The first terminal passes completely through the base 12 for external connection to this first terminal 38. The screw 37 is for adjustment purposes of the first fixed contact 36 for calibration of the thermostat and a lock nut 39 maintains this calibration. A permanent magnet 40 is mounted just to the rear of the first fixed contact 36 and cooperates with a magnetic armature 41 just to the rear of the first movable contact 22. The other end of the flexible pigtail 33 is fastened to a second terminal 42 fixedly carried in the base 12 and extending therethrough for external electrical connection.

Third, fourth, fifth, sixth, and seventh terminals 43, 44, 45, 46, and 47, respectively, are fixedly mounted in the base 12 and extend therethrough for external electrical connection. A switch blade 50 has one end fixed to the third terminal 43 and the other end is movable and carries a second movable contact 51. The second movable contact 51 cooperates with a second fixed contact 52 mounted on the fourth terminal 44. An auxiliary blade 53 moves with the switch blade 50 and the movable end 54 thereof makes contact with the fifth terminal 45. A pilot switch blade 55 is mounted on the seventh terminal 47 and a movable end 58 thereof makes contact with a contact 59 on the sixth terminal 46. This pilot switch blade 55 carries an insulator button 60 for movement in accordance with movement of the switch blade 50.

A rotary shaft 63 is journalled in the base 12 and carries a first and a second rotary cam 64 and 65, respectively. The first rotary cam 64 engages a bent medial portion 66 on the support blade 28 which acts as a cam follower. The cam 64 has a notch 67 and in FIGURE 1 this notch is shown positioned to be in cooperation with the cam follower 66 so as to establish the first contacts 22 and 36 widely separated and in an off condition. The first cam 64 has a variable radius relative to the shaft 63 to variably adjust the position of the first movable contact 22 relative to the first fixed contact 36.

The second cam 65 acts on a bent medial portion 69 of the switch blade 50 as a cam follower to move this switch blade 50. The second cam 65 has a notch 70 and FIGURE 1 shows this notch in cooperation with the cam follower 69 so that the second contacts 51 and 52 are established widely separated for an off condition of the thermostat 10. Smaller notches 71 are also established at different points on the periphery of the second cam 65 to give a detent or sensory indication to the operator to indicate the boundary between different heat ranges. The main cam surface of the cam 65, when in cooperation with the cam follower 69, establishes the second contacts 51 and 52 in the closed position and also establishes closed the auxiliary blade 53 with the fifth terminal 45 and the pilot switch blade 55 with the sixth terminal 46.

The FIGURE 3 is a combined schematic and circuit diagram of the switch 10 and shows that the first and fourth terminals 38 and 44 are connected to opposite ends of an electrical resistance unit 72 which may be a surface heating unit of an electric range. A voltage supply source 73 may be an A.C. or D.C. source but is shown as an A.C. source having a neutral terminal 74 and first and second line terminals 75 and 76. The first line terminal 75 is connected to the second terminal 42 and the second line terminal 76 is connected to the third terminal 43. When the contacts are closed, this will provide energization to the surface heating unit 72 from the first and second line terminals 75 and 76. For example, this may be 230 volt energization. The auxiliary switch blade 53 may be used to control a circuit to a pilot light 77 from the input neutral terminal 74, which, for example, may provide 115 volt energization. The pilot switch blade 55 is a separate insulated circuit which may be used to control a circuit connected to conductors 78 for any control or indicating purposes.

Operation

When the shaft 63 is rotated counterclockwise from the position shown in FIGURE 1, the cam 64 cooperating with the support blade 28 at the cam follower 66 will cause the contacts 22 and 36 to close. Also, the cam 65 closes the second contacts 51 and 52. As seen in FIGURE 3, this establishes a closed circuit with voltage being applied to the surface heating unit 72. Current flows through the bimetallic leg 17 and the flexible conductor 33 and this flow of current starts to heat the bimetallic leg 17. The initial heating of this leg 17 is at the narrowed portion 26 and because this is positioned close to the movable contact 22, the deflectional urging caused by such heating is minimized. The bimetallic leg 17 is so positioned that heating thereof causes movement of the contact 22 away from contact 36 and, hence, this heating will eventually open the circuit.

Figure 4:
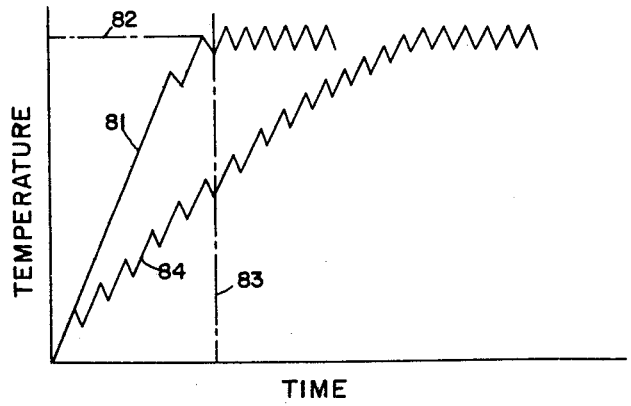
FIGURE 4 is a graph of operating conditions of the switch.

The graph of FIGURE 4 shows a curve 81 of the switch 10 and shows that the surface heating unit 72 provides heating to a vessel and the vessel temperature is that which is plotted in FIGURE 4. This graph 81 shows that the temperature rapidly climbs at an initial slope determined by the wattage rating of the heating unit 72. The fact that the narrowed portion 26 is provided, and is located close to the movable contact 22, is primarily responsible for only one or two cycles of operation before the operating temperature 82 is reached at time 83 which in one thermostatic switch, constructed according to the invention, was one minute for a particular wattage heating unit 72. Without this narrowed portion 26, an operating curve 84 is typical, which has six cycles of operation in the same length of time 83 and approximately twelve to fifteen cycles of operation before the operating temperature 82 is reached at a considerably longer period of time. Thus the narrowed portion 26 provides quick warm-up of the heating unit 72 yet without overshoot because the initial deflection of the entire bimetallic leg 17 is delayed upon initial passage of current therethrough.

Both bimetallic legs 17 and 18 deflect in the same direction upon temperature changes and therefore the bimetallic leg 18 may be considered to be an ambient temperature compensating leg because for changes in the ambient temperature, other conditions being constant, the insulating bar 19 moves toward or away from the mounting flange 31 yet the position of the movable contact 22 does not change relative to the fixed contact 36. This is a highly desirable feature because in many instances the thermostatic switch 10 will be mounted in a back splasher or apron of an electric range where the ambient temperature may be quite high and where the ambient temperature may undergo considerable change during cooking operations.

The bimetallic leg 17 is temperature responsive and responsive to the current flow through this leg to cycle the contact 22. This leg also acts as a proportioning bimetal to maintain a substantially constant wattage on the heating unit 72. If, for example, the input voltage at terminals 75 and 76 increases 5%, then this raises the current approximately 5% and this increased current through the bimetallic leg 17 causes it to heat faster and in so doing, the contacts 22 and 36 are closed a shorter proportion of the time. During this closed condition of the contacts 22 and 36, of course, the current is flowing and causing heating both of the heating unit 72 and the bimetallic leg 17. Upon sufficient heating of the bimetallic leg 17, it moves to open the contacts 22 and 36 and therefore both the leg 17 and the heating unit 72 cool. This is the cycling about the median operating temperature 82 as shown in FIGURE 4. The magnet 40 and armature 41 provide a relatively quick make and break to the contacts 22 and 36 because as the contact 22 nears the contact 36 during cooling of the leg 17, the magnetic attraction of the magnet 40 for the armature 41 will reach a point where it is sufficient to quickly pull the contacts closed. Conversely, as the bimetallic leg 17 heats up by passage of current, it increases its urge to move the contact 22 away from contact 36. A point will be reached whereat this internal stress of the leg 17 eventually overcomes the magnetic attraction and thus the contacts 22 and 36 are quickly broken. This minimizes arcing at the contacts 22 and 36 and; hence, minimizes pitting and burning.

It will be noted that the entire bimetallic U-shaped structure 16 is capable of being bodily moved relative to the housing 11 since neither end of either leg 17 or 18 is directly connected to the housing 11. The insulated bar 19 moves with ambient temperature changes, the movable contact 22 moves primarily in response to current flow through the bimetallic leg 17 and the first end 24 of the bimetallic leg 18 moves in response to changes in position of the support blade 28.

A calibrated knob, not shown, may be attached to the shaft 63 for adjustment purposes and it will be seen that the entire switch 10 may be continuously controlled without any steps throughout the complete range of operation. Also, the combination of the infinitely variable thermostatic switch 10 and the surface heating unit 72 provides a control which is more economical and more satisfactory than the prior art seven-position switches controlling a two-resistance element heating unit.

The rotatable cam 64 has a variable radius from the shaft 63 and is proportioned such that upon initial counterclockwise rotation of the shaft 63, the contacts 22 and 36 are closed when the unit is cold. The contacts 22 and 36, however, are not pressed together very tightly in this condition and therefore only a fairly low average temperature of the bimetallic leg 17 is necessary to cause the contacts 22 and 36 to cycle on and off. If the shaft 63 is rotated nearly 360°, however, the contacts 22 and 36 are pressed quite tightly together and therefore considerable heat is required in the bimetallic leg 17 to open the contacts 22 and 36. This means that a much higher operating temperature is achieved.

It will be noted that many different forces act on the first movable contact 22; namely, the rotatable cam 64 for setting the desired operating point, the ambient temperature compensating means as established by the second leg 18, the cycling means as determined by current flow through the temperature responsive leg 17 which also includes the proportioning means to maintain substantially constant wattage on the heating unit 72 and which includes the narrowed portion 26 to delay initial cycling of the contact 22, and the magnet 40 to establish quick make and break of the contacts 22 and 36. The adjusting screw 37 may be adjusted from outside the housing 11 and may conveniently be adjusted at the factory during manufacture and then may be locked in place by the lock nut 39.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A thermostatic switch for a heating unit, comprising, in combination, a base, a bimetallic leg with first and second ends, ambient temperature compensation means mounting said bimetallic leg second end on said base, a movable contact carried on said bimetallic leg first end, a fixed contact carried on said base for cooperation with said movable contact, means connecting a heating unit through said contacts and said bimetallic leg in series to a voltage source for energizing said heating unit, a reduced cross sectional area portion in said bimetallic leg near said first end thereof and deflecting in the same direction upon temperature rise as the remainder of said leg, said reduced cross sectional area portion retarding initial movement of said movable contact, and a rotatable cam on said base and acting on said ambient temperature compensation means to change the position of said bimetallic leg relative to said base, whereby current to said heating unit passes through said bimetallic leg to have it act as a proportioning bimetal for a voltage compensating effect for substantially constant wattage on said heating unit.

2. A thermostatic switch for an electrical heating unit, comprising, in combination, a base, a bimetallic leg with first and second ends, ambient temperature compensation means mounting said bimetallic leg second end on said base, a movable contact carried on said bimetallic leg first end, a fixed contact carried on said base for cooperation with said movable contact, means connecting an electrical heating unit through said contacts and said bimetallic leg in series to a voltage source for energizing said heating unit, a rotatable shaft journalled on said base, a rotatable cam fixed on said shaft and acting on said ambient temperature compensation means to change the position of said bimetallic leg relative to said base, and said bimetallic leg having a reduced cross sectional area near said first end thereof to establish the greatest heat thereat, said reduced cross sectional area deflecting in the same direction as said bimetallic leg upon temperature rise to retard initial movement of said movable contact, whereby current to said heating unit passes through said bimetallic leg to have it act as a proportioning bimetal for a voltage compensating effect for substantially constant wattage on said heating unit.

3. A thermostatic switch for a controllable heating unit, comprising, in combination, a base, a resilient support blade having first and second ends, means mounting said second end fixedly on said base, a bimetallic leg with first and second ends, ambient temperature compensation means mounting said bimetallic leg second end on said support blade first end, a movable contact carried on said bimetallic leg first end, a fixed contact carried on said base for cooperation with said movable contact, means connecting a controllable heating unit through said contacts and said bimetallic leg in series to a voltage source for energizing said controllable heating unit, a rotatable shaft journalled on said base, a rotatable cam fixed on said shaft and acting on a medial portion of said support blade to change the position of said bimetallic leg relative to said base, and said bimetallic leg having a reduced cross sectional area near said first end thereof to establish the greatest heat thereat to retard initial movement of said movable contact, whereby current to said controllable heating unit passes through said bimetallic leg to have it act as a proportioning bimetal for a voltage compensating effect for substantially constant wattage on said heating unit.

4. A thermostatic switch for a controllable heating unit, comprising, in combination, a base, a resilient support blade having first and second ends, means mounting said second end fixedly on said base, a bimetallic leg with first and second ends, ambient temperature compensation means mounting said bimetallic leg second end on said support blade first end, a movable contact carried on said bimetallic leg first end, a fixed contact carried on said base for cooperation with said movable contact, first and second terminals on said base, means connecting said fixed contact to said first terminal, a flexible pigtail connecting said bimetallic leg second end to said second terminal, means connecting a controllable heating unit through said first and second terminals to a voltage source for energizing said controllable heating unit, a cam acting on a medial portion of said support blade to change the position of said bimetallic leg relative to said base, and said bimetallic leg having a reduced cross sectional area near said first end thereof to establish the greatest heat thereat to retard initial movement of said movable contact, whereby current to said controllable heating unit passes through said bimetallic leg to have it act as a proportioning bimetal for a voltage compensating effect for substantially constant wattage on said heating unit.

5. A thermostatic switch for a controllable heating unit, comprising, in combination, a base, a U-shaped structure having first and second bimetallic legs each with first and second ends and with said second ends interconnected to form said U-shape, means movably mounting said second leg first end to said base, a movable contact carried on said first leg first end, a fixed contact carried on said base for cooperation with said movable contact, a flexible pigtail connecting said first leg second end to said base, means connecting a controllable heating unit through said contacts and said first leg and pigtail in series to a voltage source for energizing said controllable heating unit, adjustment means acting on said movable mount to change the position of said U-shaped structure relative to said base, a reduced cross sectional area portion in said bimetallic leg near said first end thereof and deflecting in the same direction upon temperature rise as the remainder of said leg, said reduced cross sectional area portion retarding initial movement of said movable contact, and both said first and second legs being bimetallic and deflecting in the same direction relative to the base upon temperature rise.

6. An infinite control thermostatic switch for a controllable heating unit, comprising, in combination, a base, a bimetallic U-shaped structure having first and second legs each with first and second ends and with said second ends interconnected to form said U-shape, means movably mounting said second leg first end to said base, a movable contact carried on said first leg first end, a fixed contact carried on said base for cooperation with said movable contact, first and second terminals on said base, means connecting said fixed contact to said first terminal, a flexible pigtail connecting said first leg second end to said second terminal, means connecting a controllable heating unit through said first and second terminals to a voltage source for energizing said controllable heating unit through said first leg, a cam acting on said movable mount to change the position of said U-shaped structure relative to said base, said first leg having a reduced cross sectional area near said first end thereof to establish the greatest heat thereat, said reduced cross sectional area and the remainder of said first leg deflecting in the same direction upon temperature rise, and both said first and second legs being bimetallic and deflecting in the same direction relative to the base upon temperature rise, whereby current to said controllable heating unit passes through said first leg to have it act as a proportioning bimetal for a voltage compensating effect for substantially constant wattage on said heating unit and whereby changes in the temperature of the ambient affects both legs substantially equally to move said second ends of said first and second legs relative to said base yet to effect substantially no change in the position of said movable contact relative to said base.

7. An infinite control thermostatic switch for a controllable heating unit, comprising, in combination, a base, a resilient support blade having first and second ends, means mounting said second end fixedly on said base, a bimetallic U-shaped structure having first and second legs each with first and second ends and with said second ends interconnected to form said U-shape, means mounting said second leg first end to said support blade first end, a movable contact carried on said first leg first end, a fixed contact carried on said base for cooperation with said movable contact, first and second terminals on said base, means connecting said fixed contact to said first terminal, a flexible pigtail connecting said first leg second end to said second terminal, means connecting a controllable heating unit through said first and second terminals to a voltage source for energizing said controllable heating unit through said first leg, a cam acting on a medial portion of said support blade to change the position of said U-shaped structure relative to said base, said first leg having a reduced cross sectional area near said first end thereof to establish the greatest heat thereat, and both said first and second legs being bimetallic and deflecting in the same direction relative to the base upon temperature rise, whereby current to said controllable heating unit passes through said first leg to have it act as a proportioning bimetal for a voltage compensating effect for substantially constant wattage on said heating unit and whereby changes in the temperature of the ambient affects both legs substantially equally to move said second ends of said first and second legs relative to said base yet to effect substantially no change in the position of said movable contact relative to said base.

8. An infinite control thermostatic switch for a controllable heating unit, comprising, in combination, a base, a resilient support blade having first and second ends, means mounting said second end fixedly on said base, a bimetallic U-shaped structure having first and second legs each with first and second ends and with said second ends interconnected to form said U-shape, means mounting said second leg first end to said support blade first end, a first movable contact carried on said first leg first end, a first fixed contact carried on said base for cooperation with said movable contact, a switch blade mounted on said base and carrying a second movable contact, a second fixed contact carried on said base for cooperation with said second movable contact, first, second, third and fourth terminals on said base, means connecting said first fixed contact to said first terminal, a flexible pigtail connecting said first leg second end to said second terminal, means connecting said second fixed contact to said third terminal, means connecting said second movable contact to said fourth therminal and with a controllable heating unit adapted to be connected through said contacts and terminals in series to a voltage source for energizing said controllable heating unit through said first leg, adjustment means acting on a medial portion of said support blade to change the position of said U-shaped structure relative to said base, means acting on a medial portion of said switch blade to open and close said second movable contact as an on-off switch, said first leg having a reduced cross sectional area near said first end thereof to establish the greatest heat thereat, and both said first and second legs being bimetallic and deflecting in the same direction relative to the base upon temperature rise, whereby current to said controllable heating unit passes through said first leg to have it act as a proportioning bimetal for a voltage compensating effect for substantially constant wattage on said heating unit and whereby changes in the temperature of the ambient affects both legs substantially equally to move said second ends of said first and second legs relative to said base yet to effect substantially no change in the position of said first movable contact relative to said base.

9. An infinite control thermostatic switch, comprising, in combination, a base, a resilient support blade having first and second ends, means mounting said second end fixedly on said base, a bimetallic U-shaped structure having first and second legs each with first and second ends and with said second ends interconnected to form said U-shape, means mounting said second leg first end to said support blade first end, adjustment means acting on a medial portion of said support blade to change the position of said U-shaped structure relative to said base, a first movable contact carried on said first leg first end, a first fixed contact carried on said base for cooperation with said movable contact, first, second, third, and fourth terminals on said base, means connecting said first fixed contact to said first terminal, a switch blade mounted on said base and carrying a second movable contact, a second fixed contact carried on said base for cooperation with said second movable contact, means acting on a medial portion of said switch blade and having off and on conditions to open and close said second contacts, means connecting said third terminal to said second fixed contact with said first and third terminals adapted to be connected to a controllable heating unit, means connecting said second movable contact to said fourth terminal, a flexible pigtail connected from the second end of said first leg to said second terminal and with said second and fourth terminals adapted to be connected to a voltage source for energizing said controllable heating unit through said first leg, both said first and second legs being bimetallic and deflecting in the same direction relative to the base upon temperature rise, and said first leg having a reduced cross sectional area near said first end thereof to establish the greatest heat thereat to retard initial movement of said first movable contact, whereby current to said controllable heating unit passes through said first leg to have it act as a proportioning bimetal for a voltage compensating effect for substantially constant watage on said heating unit and whereby changes in the temperature of the ambient affects both legs substantially equally to move said second ends of said first and second legs relative to said base yet to effect substantially no change in the position of said first movable contact relative to said base.

10. A thermostatic switch for a heating unit, comprising, in combination, a base, a bimetallic leg with first and second ends, means mounting said bimetallic leg second end on said base, a movable contact carried on said bimetallic leg first end, a second contact carried on said base for cooperation with said movable contact, means connecting a heating unit through said contacts and said bimetallic leg in series to a voltage source for energizing said heating unit, a reduced cross sectional area portion in said bimetallic leg near said first end thereof and deflecting in the same direction upon temperature rise as the remainder of said leg, said reduced cross sectional area portion retarding initial movement of said movable contact, and a rotatable cam on said base and acting on said mounting means to change the position of said bimetallic leg relative to said base.

References Cited in the file of this patent

UNITED STATES PATENTS

| | | |
|---|---|---|
| 1,943,656 | Doman et al. | Jan. 16, 1934 |
| 1,962,587 | Getchell | June 12, 1934 |
| 2,171,272 | Kronmiller et al. | Aug. 29, 1939 |
| 2,487,204 | Woolnough | Nov. 8, 1949 |
| 2,587,334 | Kronmiller | Feb. 26, 1952 |
| 2,709,729 | Walker et al. | May 31, 1955 |
| 2,798,131 | Collier | July 2, 1957 |
| 2,798,132 | Collier | July 2, 1957 |
| 2,813,172 | Wojcik | Nov. 12, 1957 |
| 2,870,290 | Taylor et al. | Jan. 20, 1959 |
| 2,906,839 | Ashe et al. | Sept. 29, 1959 |